United States Patent [19]

Lüpertz

[11] 4,324,271
[45] Apr. 13, 1982

[54] PRESSURE REDUCING VALVE

[75] Inventor: Hans-Henning Lüpertz, Darmstadt, Fed. Rep. of Germany

[73] Assignee: ITT Industries, Inc., New York, N.Y.

[21] Appl. No.: 167,613

[22] Filed: Jul. 11, 1980

[30] Foreign Application Priority Data

Aug. 8, 1979 [DE] Fed. Rep. of Germany ....... 2932142

[51] Int. Cl.³ .............................................. F16K 17/26
[52] U.S. Cl. .................................. 137/493; 303/6 C; 137/493.9
[58] Field of Search ................... 137/493, 493.7, 493.9; 60/654; 303/6 C

[56] References Cited

U.S. PATENT DOCUMENTS

| | | | |
|---|---|---|---|
| 3,388,950 | 6/1968 | Stelzer | 303/6 C |
| 3,463,556 | 8/1969 | Kerating | 137/493.7 X |
| 3,492,051 | 1/1970 | Kerating | 303/6 C |
| 3,508,792 | 4/1970 | Bueler | 137/493.9 X |

Primary Examiner—Harold W. Weakley
Attorney, Agent, or Firm—John T. O'Halloran; Alfred C. Hill

[57] ABSTRACT

Known pressure reducing valves for brake systems of automotive vehicles are provided with a stepped piston and a valve. Upon attainment of the switching pressure the valve is closed and the pressure is reduced at the outlet according to the ratio of surfaces of the stepped piston. These known pressure reducing valves are insecure in their operation, complicated in their structure and expensive in their manufacture. These disadvantages are overcome in accordance with the present invention by providing a valve closing unit including an elastic rubber sealing body disposed at the inlet end of a pressure medium connection in the piston between an inlet chamber and an outlet chamber. When the switching pressure is reached this sealing body closes the pressure medium connection. If the pressure in the outlet chamber is greater then the pressure in the inlet chamber, the sealing body due to its elasticity lifts off the inlet side of the pressure medium connection.

15 Claims, 3 Drawing Figures

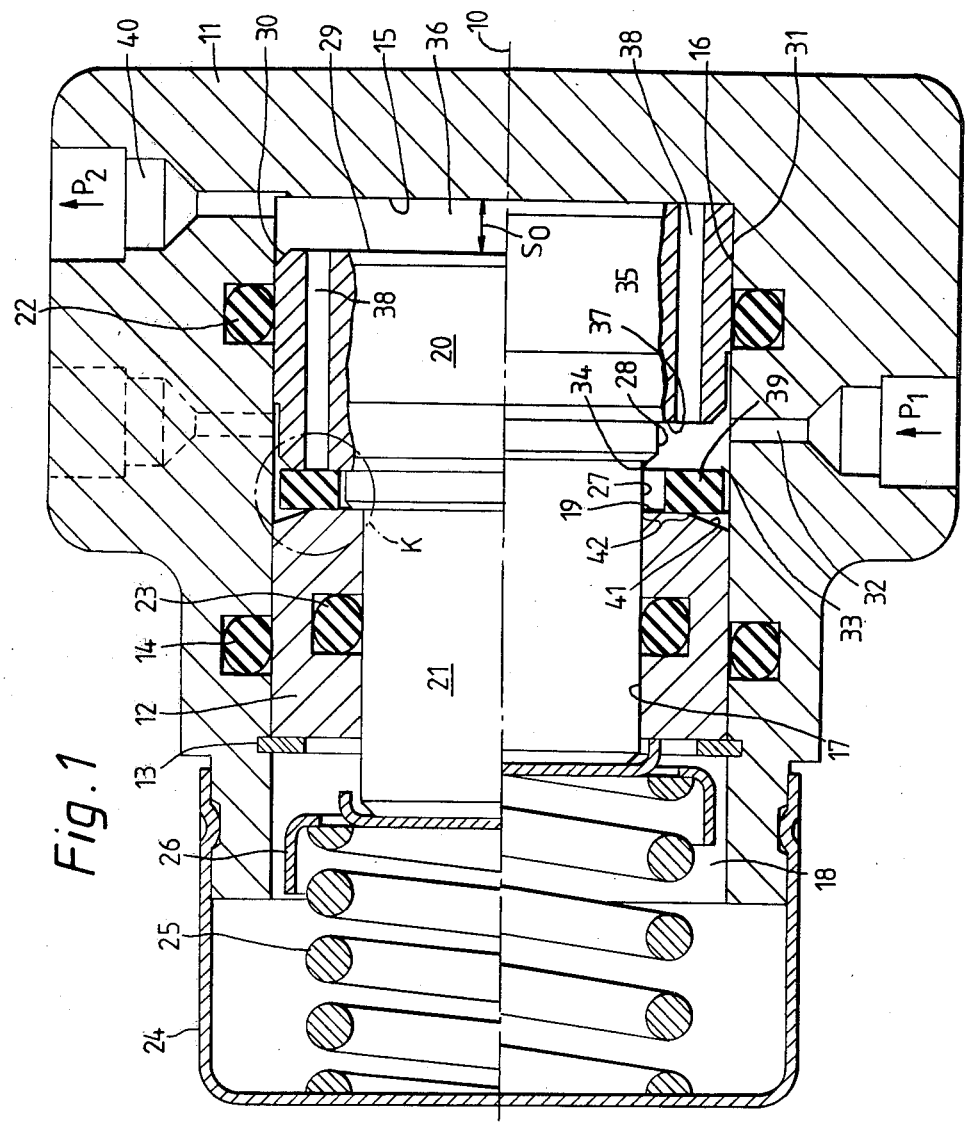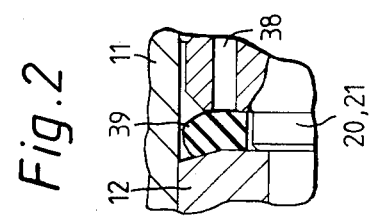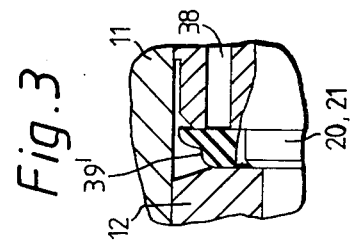

PRESSURE REDUCING VALVE

BACKGROUND OF THE INVENTION

The present invention relates to a pressure reducing valve for vehicle hydraulic brake systems for reducing the pressure by means of a stepped piston above a certain pressure (switching pressure). When the switching pressure is attained at least one connecting channel between inlet and outlet is blocked by a sealing body closing the inlet end of the connecting channel.

A pressure reducing valve of this type is intended to reduce the brake pressure acting on the rear wheels in the zone above the switch pressure in order to thus adapt the brake force to the dynamic axle load removal at higher brake decelerations. In a known pressure reducing valve of this type disclosed in German Patent DT-AS No. 1,505,448 the changeover device which is responsive to the switching pressure is designed as a spring-actuated valve comprising a valve body, a sealing body and a valve spring. The valve is adapted to leave its closed position only if the supply pressure is still further increased following closing. The known pressure reducing valve is not in a position to obey a reduction in the supply pressure immediately after closing, i.e. after the change-over to pressure reduction has occurred. If used in a rear-axle brake circuit, the rear-axle braking action will be maintained, even if the operator would like to reduce the braking action precisely in that particular instance.

SUMMARY OF THE INVENTION

An object of the present invention is to provide a pressure reducing valve of the above type which eliminates this disadvantage and the hazards thereby involved.

Another object of the present invention is to provide a pressure reducing valve of the above type having a simplified structure and at the same time afford the possibility of its manufacture with less material requirements and at lower cost.

A feature of the present invention is the provision of a pressure reducing valve comprising: a housing having a stepped bore therein disposed coaxial of a longitudinal axis; a stepped piston disposed in the bore coaxial of the axis, the piston including a larger diameter portion having an end surface defining an outlet chamber and smaller diameter portion defining an inlet chamber; at least one connecting channel between the inlet chamber and the outlet chamber disposed in the larger diameter portion; and an elastic rubber sealing body disposed in the bore adjacent a inlet orifice of the channel adjacent the inlet chamber to close the channel when a given switching pressure is achieved, the body being movable into abutment with a stop formed in the surface of the bore remote from the orifice, the stop being configured to enable an elastic deformation of the body when the pressure in the outlet chamber is greater than the pressure in the inlet chamber to open at least a portion of the orifice.

Accordingly, the sealing body acts like a quick-response check valve.

In another advantageous embodiment of this invention, several connecting channels are provided which are spaced around the periphery of the stepped piston and arranged to be jointly closed by the annular sealing body. When installed in the vehicle, the longitudinal axis (axis of symmetry) of the new pressure reducing valve is preferably arranged vertically.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross sectional view of a pressure reducing valve in accordance with the principles of the present invention, the valve being symmetrical about the longitudinal axis thereof with the valve shown in the inactive position and unpressurized state below the center line of longitudinal axis, and above the center line in the position which the movable parts assume at the change-over of switching point;

FIG. 2 is a detail of the components in circle K of FIG. 1, with the components shown in a specific operation position; and FIG. 3 is a detail of the components in circle K of FIG. 1 showing another embodiment of the components therein.

DESCRIPTION OF THE PREFERRED EMBODIMENTS

Referring to FIG. 1, for reasons which are known and obvious, the cavities and the parts movable therein are rotationally symmetrical about the longitudinal axis or center line 10. The space internal of the housing 11 comprises a blind-end bore having three sections, i.e., a larger-diameter cylindrical chamber 16 bounded by the bottom or the housing end wall 15, an adjacent smaller-diameter chamber 17, likewise cylindrical, and section 18 which is open towards atmosphere. The full cross-sectional area of larger chamber 16 blends into the full cross-sectional area of smaller chamber 17 via a substantially radially extending annular end or stop surface 19.

The stepped piston comprises two cylindrical sections 20 and 21 of distinct diameters, these diameters being adapted to the diameters of chamber sections 16 and 17. Larger piston section 20 is sealed by ring seal 22 and its outer surface is guided along the inner wall surface of the larger-diameter cylindrical chamber 16. In the same manner, smaller piston section 21 is guided in smaller chamber 17 and sealed by seal 23. Smaller piston section 21 completely occupies the volume of smaller cylindrical chamber 17, extending with its end remote from larger piston section 20 into section 18 which is under atmospheric pressure. In a manner affording ease of manufacture, intermediate housing section 17 is provided by a cylindrical ring 12 which is in a sealing fit by seal 14 within the larger housing bore and maintained in its position by a circlip 13. From the point of view of operations, parts 12, 13 and 14 may be considered as parts of housing 11. The left end of housing 11, when viewing the drawing, is bridged or closed by a cap 24 acting as an abutment for a helical spring 25 which is coaxial with axis 10 and bears with its other (right) end against the left end of the stepped piston through a spring plate 26. The axial length of larger-diameter chamber 16 is greater than the axial length of large piston section 20.

Intermediate annular end or radial stop surface 19 and chamber bottom 15, piston 20/21 comprises the following sections. Depending on the position, a cylindrical section 27 belonging to piston section 21, an adjacent annular section 28 having a somewhat larger diameter and forming a step between its larger diameter and the diameter of section 27, the step abutting against radial surface 19 to limit the displacement; and adjacent to annular cylinder surface 28, through a substantially radial end surface, is the cylindrical skirt surface of large piston section 20 which blends into large piston section end surface 29 on the side close to chamber bottom 15. The transition may be rounded off or chamfered as shown at 30. The distance between surfaces 19 and 15 is greater than the sum of the axial lengths of piston section 20 (cylindrical surface 31) and section 28. The difference between these two piston lengths, on the one hand, and the cited axial direction, on the other hand, determines the axial displacement $s_o$ of the stepped piston. This displacement describes at the same time the range of the forces exerted by spring 25.

The orifice of inlet channel 32 lies in an axial direction between surface 19 and seal 22, such that the pressure $p_1$ it supplies is always present in annular chamber 33. In order to ensure that this is the case also when abutment step 34 is in engagement with end surface 19, the outer circumferential surface of large piston section 20 is slightly reduced in circumference in the section adjacent chamber 33 which is used neither for guiding the piston nor for sealing it, so that a suitable annular pocket 35 is formed. Chamber 36 which is formed between piston end surface 29 and chamber bottom 15 and whose volume depends on the position of piston 20, 21 communicates with the piston annular surface 37 bounding chamber 33 through bores or channels 38 parallel to axis 10 and spaced around the circumference in the manner of a collar. The orifices of these channels 38 adjacent to annular chamber 33 may be closed by an elastic rubber sealing body 39. Chamber 36 is in permanent hydraulic connection with an outlet port 40 which in the embodiment of FIG. 1 is connected with a rear-axle brake circuit pressurized by fluid pressure $p_2$.

A characteristic feature of the present invention is the geometrical design of the cross-sectional area or boundary and of the dimensions of annular chamber 33 and the sealing body 39 accommodated therein.

In the embodiment of FIG. 1, sealing body 39 is of toroidal shape, its cross-sectional area being a rectangle. The inside diameter of the toroid is greater than the diameter of annular section 28. The zone where step 34 blends into annular section 28 is stepped or chamfered, enabling section 28 to slide relative to sealing body 39 into a position in which body 39 encompasses section 28 from the outside. In other words, body 39 cannot be clamped between step 34 and surface 19. In an axial direction, body 39 is slightly longer than the axial distance between step 34 and piston annular surface 37. This enables the possibility of clamping sealing body 39 between surface 37 and surface 19. Surface 19 extends in a radial direction only in its radially inwardly situated annular zone at 42. In its outwardly situated zone at 41, it is set back, approximately in the form of a tapered ring surface, so that when sealing body 39 is clamped between surface 37 and zone 42 of surface 19, the outer section of sealing ring 39 in the area of zone 41 is maintained freely flexible in an axial direction like a beam or leaf spring fixed at one end only. The radial position of the circumferential edge which is formed where zone 42 blends into zone 41 is chosen with respect to the radial position and extension of the orifices of channels 38 such that, through the effect of its rubber elasticity, sealing body 39 when it is firmly fixed between surface 37 and zone 42, is urged into engagement with the orifices of channels 37 and, thus, closes them. However, on account of the set-back of zone 41 relative to zone 42, the outer free annular area of sealing body 39 is permitted to escape towards zone 41 if it is forced to do so due to the action of a correspondingly high pressure in channels 38. A sufficiently high excess pressure $P_2$ relative to pressure $P_1$ is, thus, in a position to open connecting channels 38 between chambers 36 and 33 and, consequently, between outlet port 40 and inlet port 32, resulting in a prompt fall of presence. Sealing body 39 has the effect of a check valve made from a rubber-elastic material. The comparison with a shuttle valve appears likewise suitable. Accordingly, annular sealing body 39 not only acts as a seal, but at the same time also as a valve body and valve spring.

Consequently, the mode of operation of the new pressure reducing valve is the following. In the normal position, spring 25 urges stepped piston 20, 21 against end wall 15. Annular sealing body 39 lies loosely in its annular chamber 33 and will not move into sealing engagement with the orifices of channels 38 on its own. Moreover, the orifice of inlet port 32 is suitably situated such that the inflow of fluid will keep body 39 somewhat spaced from surface 37. For this purpose, the area where surface 37 blends into the cylindrical outer surface may be chamfered as shown to form a narrow tapered guiding surface.

It is preferred to install the new pressure reducing valve with its axis 10 in a vertical position with the righthand end thereof as viewed in the drawing being at the top. Through the effect of the forces of gravity, this will likewise result in a clearly defined position of sealing body 39, i.e., its engagement position with zone 42 of surface 19.

When channels 38 are open, pressures $p_1$ and $p_2$ are of equal magnitude. In addition to spring 25 and the atmospheric pressure from section 18 which acts on the cross-sectional area of piston section 21, the piston is acted upon hydraulically by pressure $p_1=p_2$ which is applied to the differential in area between the cross-sectional areas of the large piston section 20 and the annular surface of chamber 33 projected in the axial direction. An increase in the inlet pressure causes the piston to move towards surface 19 in opposition to the force of spring 25. When the piston has travelled distance $s_o$, body 39 is firmly clamped in position between surface 37 and zone 42, the orifices of channels 38 are elastically closed by body 39, and step 34 is in abutment with surface 19. The two hydraulic chambers 33 and 36, 40 are thus isolated from each other. An increase of pressure $p_1$, or a decrease of pressure $p_2$ again results in movement of the piston to the right, with the load being removed from spring 25, because the higher pressure in annular chamber 33 causes body 39 to be urged into engagement with surface 37, thereby keeping the orifices of channels 38 closed. Pressure $p_1$, however, is transmitted to the rear-axle circuit in a reduced degree only, the reduction known per se being due to the different cross-sectional areas of the stepped piston. When pressure $p_1$ drops below pressure $p_2$, channels 38 will be again opened.

In the critical case in which the pressure has just reached the change-over of switching point and piston step 34 has just moved into abutment with zone 42 of surface 19, channels 38 are closed. To achieve opening of the channels when pressure $p_1$ drops, it is, however, not necessary to have free play between step 34 and zone 42, because body 39, by elastic deformation, is free to escape towards zone 41 so that such an abrupt pressure reversal is compensated for via channels 38. FIG. 2 shows this state, the outer part of sealing body 39 being bent away from the orifice by the pressure in channel 39.

The embodiment of FIG. 3, while showing normally identical relationships, differs only by the shape of the cross-sectional area of rubber sealing body 39'. The outer annular area of sealing body 39' having its inner portions normally clamped in the same manner is slimmer than the inner portion and, hence, permits bending at a lower force. Accordingly, this bending is achieved in the presence of a lower differential between the pressures in channels 38, on the one hand, and annular chamber 33, on the other hand.

The sealing body 39 may also have other forms than those shown here. In the relaxed state, for example, it may be slightly inclined towards the orifices of channels 38 so that it is under obvious deformation stresses when it assumes one of the shapes illustrated in FIGS. 1 and 3 and, accordingly, is urged into abutment with the channel orifices to provide a seal.

The simplicity of the structure of the new pressure reducing valve becomes apparent from the drawing. With the exception of bores 38, all individual surfaces of the stepped piston permit manufacture by turning. The chambers described are produced from the blind-end bore constituting the interior of the housing by inserts 13 and 12 of very simple design. These elements and the sealing body are then only complemented by spring plate 26, cap-shaped spring abutment 24 and helical spring 25. This arrangement beneath cap 24 permits ease of access to spring 25 and also ready substitution of a spring having a different characteristic. Also in other respects, the easy accessibility of spring 25 enables the initial spring tension to be modified, for example, in dependence on the vehicle load.

Equally, the sealing body, permits a very simple design. It provides a sealing effect only in an axial direction, that means it is subject to little wear. Also, it has clearance inwardly and outwardly in a radial direction.

Apart from the advantages cited, the small overall size must also be mentioned. The single spring that is necessary has no influence on the pressure reduction ratio.

While I have described above the principles of my invention in connection with specific apparatus it is to be clearly understood that this description is made only by way of example and not as a limitation to the scope of my invention as set forth in the objects thereof and in the accompanying claims.

I claim:
1. A pressure reducing valve comprising:
a housing having a stepped bore therein disposed coaxial of a longitudinal axis;
a stepped piston disposed in said bore coaxial of said axis, said piston including a larger diameter portion having an end surface defining an outlet chamber and smaller diameter portion defining an inlet chamber;
at least one connecting channel between said inlet chamber and said outlet chamber disposed in said larger diameter portion; and
an elastic rubber sealing body disposed in said bore adjacent an inlet orifice of said channel in said inlet chamber to keep said channel open below a given switching pressure and to close said channel when said stepped piston is moved into abutment with said body upon achievement of said given switching pressure, said body being in abutment with a stop formed in the surface of said bore remote from said orifice, said stop being configured to enable an elastic deformation of at least an outer portion of said body when the pressure in said outlet chamber is greater than the pressure in said inlet chamber to open at least a portion of said orifice.
2. A valve according to claim 1, wherein
a plurality of said channels are provided spaced from each other in an annular area of said larger diameter portion, and
said body is common to each of said plurality of said channels.
3. A valve according to claim 2, wherein
said valve is installed for operation such that said axis is vertical and said outlet chamber is on top.
4. A valve according to claim 3, wherein
said inlet chamber is defined by step disposed between said larger diameter portion and said smaller diameter portion and said stop,
said orifices are disposed in said step surface, and,
said body is an annular body which completely covers said orifices and is able to engage edges of said orifices in an elastic and sealing manner, said body having a first portion extending radially toward said axis beyond said orifices, a second portion covering said orifices and a third portion extending radially away from said axis beyond said orifices, said first portion being clamped between said step and a portion of said stop perpendicular to and ajacent said axis and said third portion and an adjacent section of said second portion being spaced from another portion of said stop remote from and angled with respect to said axis when said switching pressure occurs.
5. A valve according to claim 4, wherein
said body has a rectangular cross-sectional shape.
6. A valve according to claim 1, wherein
said valve is installed for operation such that said axis is vertical and said outlet chamber is on top.
7. A valve according to claim 6, wherein
said inlet chamber is defined by a step disposed between said larger diameter portion and said smaller diameter portion and said stop,
said orifice is disposed in said step, and
said body is an annular body which completely covers said orifice and is able to engage edges of said orifice in an elastic and sealing manner, said body having a first portion extending radially toward said axis beyond said orifice, a second portion covering said orifice and a third portion extending radially away from said axis beyond said orifice, said first portion being clamped between said step and a portion of said stop perpendicular to and adjacent said axis and said third portion and an adjacent section of said second portion being spaced from another portion of said stop remote from and angled with respect to said axis when said switching pressure occurs.
8. A valve according to claim 7, wherein
said body has a rectangular cross-sectional shape.
9. A valve according to claim 1, wherein
said inlet chamber is defined by a step disposed between said larger diameter portion and said smaller diameter portion and said stop,
said orifice is disposed in said step, and
said body is an annular body which completely covers said orifice and is able to engage edges of said orifice in an elastic and sealing manner, said body having a first portion extending radially toward said axis beyond said orifice, a second portion covering said orifice and a third portion extending radially away from said axis beyond said orifice, said first portion being clamped between said step and a portion of said stop perpendicular to and adjacent said axis and said third portion and an adjacent section of said second portion being spaced from another portion of said stop remote from and angled with respect to said axis when said switching pressure occurs.

10. A valve according to claim 9, wherein said body has a rectangular cross-sectional shape.

11. A valve according to claim 1, wherein said body has a rectangular cross-sectional shape.

12. A valve according to claim 4, wherein said first portion has a cross section thicker than the cross section of said third portion and said adjacent section of said second portion.

13. A valve according to claim 7, wherein said first portion has a cross section thicker than the cross section of said third portion and said adjacent section of said second portion.

14. A valve according to claim 9, wherein said first portion has a cross section thicker than the cross section of said third portion and said adjacent section of said second portion.

15. A valve according to claim 1, wherein said body includes a first portion adjacent said axis having a cross section thicker than the cross section of a second portion remote from said axis.

* * * * *